United States Patent
Neal et al.

(10) Patent No.: US 11,606,932 B2
(45) Date of Patent: Mar. 21, 2023

(54) DOG ROPE LEASH WITH INTEGRATED STORAGE FUNCTION

(71) Applicant: TUG PET PRODUCTS, LLC., Raleigh, NC (US)

(72) Inventors: Timothy Neal, Raleigh, NC (US); Zhichao Ye, Shanghai (CN)

(73) Assignee: TUG PET PRODUCTS, LLC., Raleigh, NC (US)

( * ) Notice: Subject to any disclaimer, the term of this patent is extended or adjusted under 35 U.S.C. 154(b) by 134 days.

(21) Appl. No.: 17/179,833

(22) Filed: Feb. 19, 2021

(65) Prior Publication Data

US 2022/0095588 A1   Mar. 31, 2022

(30) Foreign Application Priority Data

Sep. 30, 2020   (CN) .......................... 202022206762.0

(51) Int. Cl.
*A01K 27/00* (2006.01)

(52) U.S. Cl.
CPC .......... *A01K 27/008* (2013.01); *A01K 27/003* (2013.01); *A01K 27/005* (2013.01)

(58) Field of Classification Search
CPC .... A01K 27/00; A01K 27/003; A01K 27/004; A01K 27/008
See application file for complete search history.

(56) References Cited

U.S. PATENT DOCUMENTS

| | | | |
|---|---|---|---|
| 5,441,017 A | 8/1995 | Lindsay | |
| 5,718,192 A | 2/1998 | Sebastian | |
| 6,019,067 A * | 2/2000 | Carey | A01K 27/006 119/795 |
| 6,073,590 A | 6/2000 | Polding | |
| 6,418,881 B1 | 7/2002 | Starratt | |
| 7,063,045 B2 | 6/2006 | Van Meter | |
| 9,491,932 B1 | 11/2016 | Becattini, Jr. et al. | |
| 9,737,055 B2 * | 8/2017 | Craig | A01K 27/008 |
| 2009/0173761 A1 * | 7/2009 | Berry | A01K 27/006 220/288 |
| 2010/0006576 A1 * | 1/2010 | Berry | A01K 27/006 220/500 |
| 2017/0094945 A1 * | 4/2017 | Sullivan | A01K 27/003 |
| 2017/0233170 A1 | 8/2017 | Badurina | |
| 2018/0077907 A1 * | 3/2018 | Flippen | A01K 27/003 |
| 2020/0305395 A1 * | 10/2020 | Haarburger | E01H 1/1206 |
| 2022/0125017 A1 * | 4/2022 | Langenbach | A01K 27/008 |

FOREIGN PATENT DOCUMENTS

| | | | | |
|---|---|---|---|---|
| GB | 2418831 A | * | 4/2006 | ........... A01K 27/006 |
| WO | WO-2005006853 A1 | * | 1/2005 | ........... A01K 27/003 |

* cited by examiner

*Primary Examiner* — Kristen C Hayes
(74) *Attorney, Agent, or Firm* — Maier & Maier, PLLC

(57) ABSTRACT

A dog rope leash with a storage function, including: a rope body, a handle on one end of the rope body, a clasp on the other end of the rope body, and a connection box mounted on the handle and/or rope body. The inside of the connection box has a storage cavity, and the surface of the connection box has an access port connected to the storage cavity. Garbage bags or other items in the storage cavity of the connecting box by designing the connection box on the dog rope leash, which is simple in structure and convenient in use.

6 Claims, 4 Drawing Sheets

DOG ROPE LEASH WITH INTEGRATED STORAGE FUNCTION

FIELD

The utility model relates to the technical field of pet supplies, in particular to dog rope leashes with storage functions.

BACKGROUND

Pet ownership is increasing each year, especially pet dogs. Walking your dog outside most certainly requires a leash and is even mandated by many local governments. Collecting and properly disposing your pet's feces during a walk is typically mandated by local government as well. Properly disposing of pet feces reduces environmental and hygeine hazards.

Currently, the most common consumer product used is a plastic bag. Waste bag dispensers are currently widely used as a device separate from a dog leash. Although most of these dispensers can be easily attached to a leash, they make distracting noises while bouncing against the leash they are attached to. These devices are bulky and cumbersome to carry, causing some dog owners to take a single waste bag and tie it around their leash. This process makes walking and picking up after your dog inconvenient.

Therefore, the design of a more convenient and practical dog rope leash is the answer to an industry's urgent technical problem.

SUMMARY

In order to solve the defects in the existing technology, the embodiments propose a dog rope leash with an integrated storage function. The connection box on the dog rope leash features a storage cavity in which pet waste bags or other items can be stored and retrieved. The structure is simple and the feature is easy to use.

The scheme adopted by the embodiments is to design a dog rope leash with storage function, including: a rope body, a handle on one end of the rope body, a clasp mounted on the other end of the rope body, and a connection box mounted on the handle and/or rope body. The inside of the connecting box has a storage cavity, and the surface of the connecting box has an access port connected to the storage chamber.

The size of the access port is smaller than the storage cavity.

There is an arch protruding part along the edge of access port.

One end of the rope body bends into a ring and closes the opening to form a handle.

The connection box is formed of a first cover body and a second cover body covering the first cover body. The access port is set on the first cover body. The first cover body is provided with a first enclosing plate protruding toward the second cover body. The second cover body is provided with a second enclosing plate with the first enclosing plate flattened into the storage cavity. The additional rope cavity outside the storage cavity in the connection box is for placing the rope. The part of the rope main body near the handle is arranged in the cavity outside the storage cavity. A portion of the handle outside of the connection box is covered with a soft protective sleeve. The end of the connection box is provided with two rope holes for assembling with the handle; the other end of the connection box is provided with a rope hole for the assembly with the main body of rope.

The first cover body and the second cover body are removable and connected together by fasteners.

The clasp is provided with a ring for connecting with the main body of the rope, where the main body of the rope loops through the ring and is secured by sewing or a clamping mechanism. The clasp is for connecting an animal collar or harness.

The junction of the rope main body is covered by the decorative sleeve or the connection box.

Compared with the existing technology, the embodiments have the following effects:

1. The integrated design of the connection box with the storage cavity is on the dog rope leash, and waste bags or other items can be placed in the storage cavity. It solves the problem of the cumbersome experience of the independent waste bag dispenser.
2. The connection box can be permanently fixed to the handle, or it can be moved on the handle to adjust the position;
3. The connection box can be used as a secondary handle.

BRIEF DESCRIPTION OF THE DRAWINGS

The utility model is described in detail below in conjunction with the implementation case and the drawings, wherein.

METHOD OF SPECIFIC APPLICATION

Figure 1:
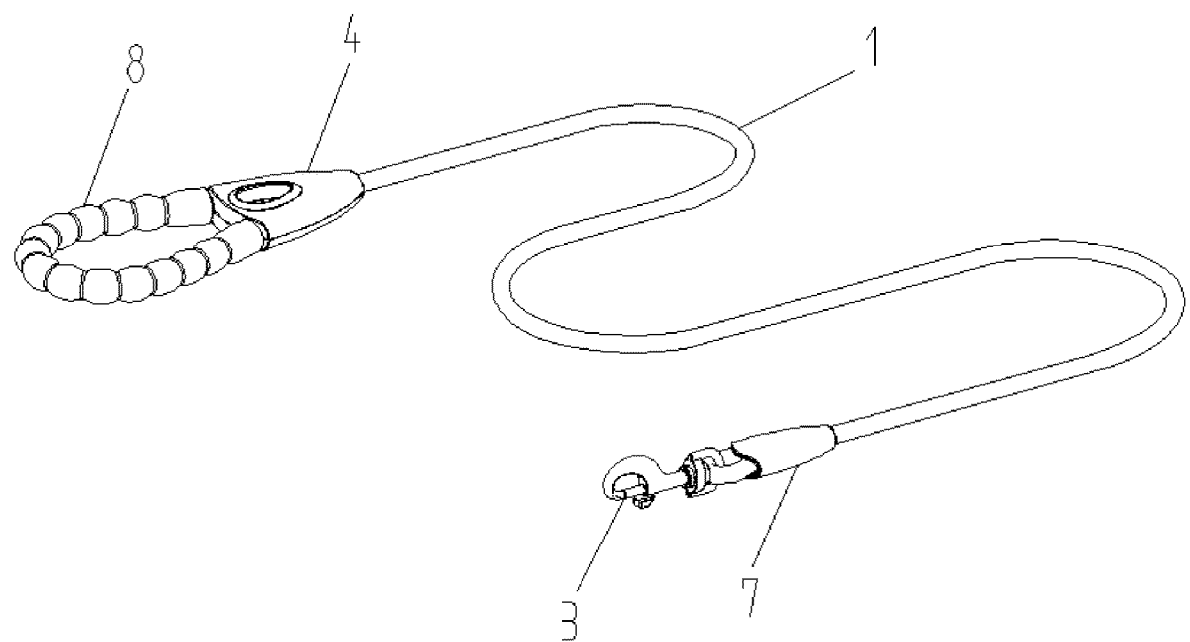
FIG. 1 is the structural view of the dog rope leash assembly.
Figure 2:
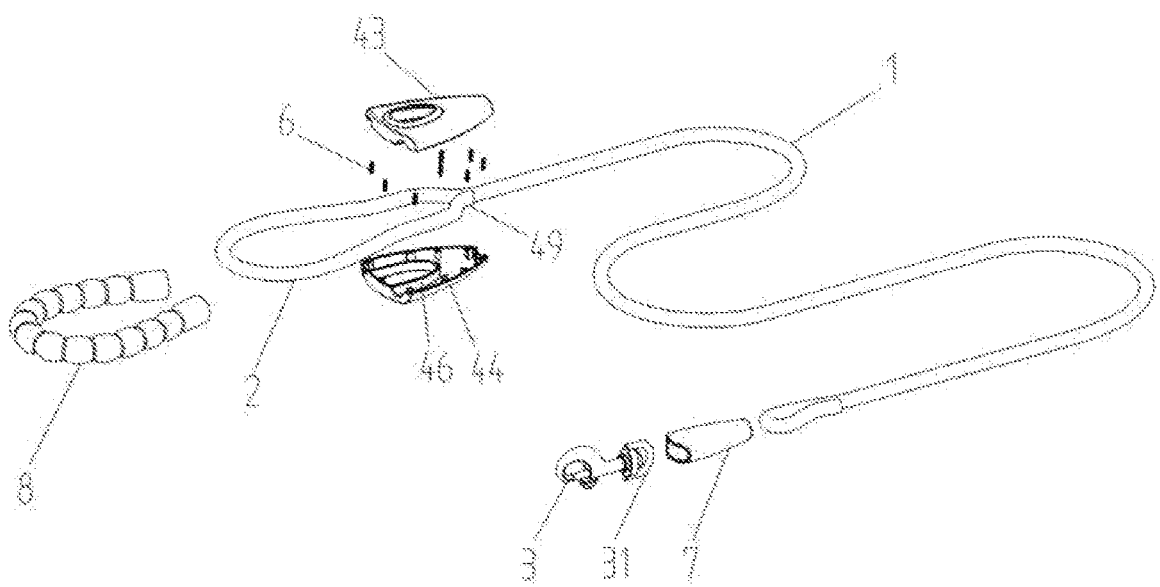
FIG. 2 is the explosive view of dog rope leash assembly.
Figure 3:
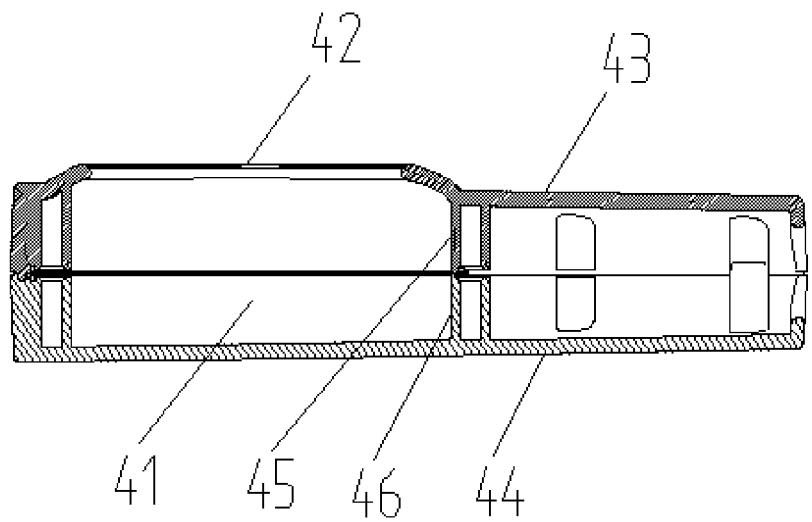
FIG. 3 is the section view of the connection box.

As shown in FIGS. 1 to 3, the dog rope leash proposed by the embodiments has a storage function, which includes: rope body 1, handle 2, clasp 3 and connection box 4, handle 2 is set at one end of rope body 1, clasp 3 is set at the other end of rope body 1, connection box 4 is installed with the handle 2. The interior of connection box 4 has a storage cavity 41, and the surface of connection box 4 has an access port 42 connected with the storage cavity 41. In order to avoid the storage cavity 41 waste bags or items from falling out, access port 42 size is smaller than the storage cavity.

Figure 4:
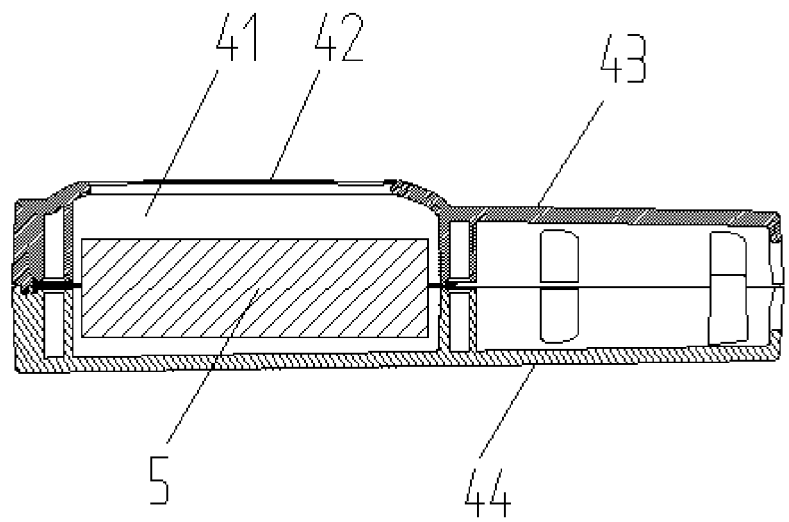
FIG. 4 is the section view of the connection box with a waste bag placed.
Figure 5:
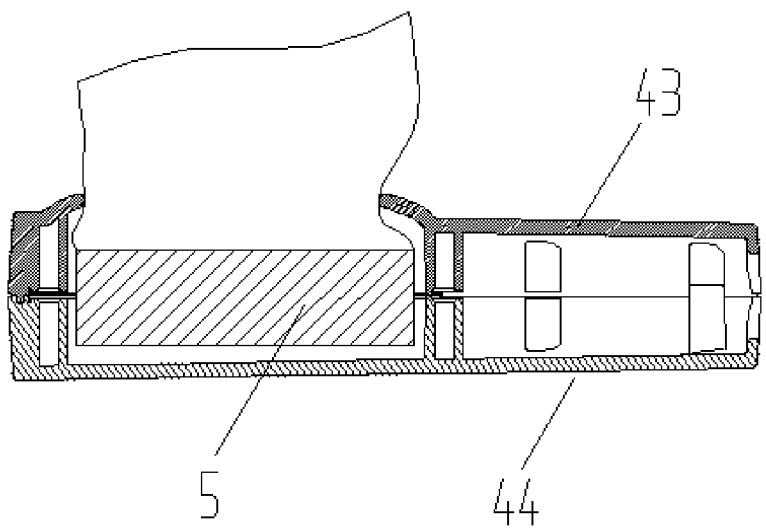
FIG. 5 is the view of the connection box with a waste bag being retrieved from the integrated dispenser.
Figure 6:
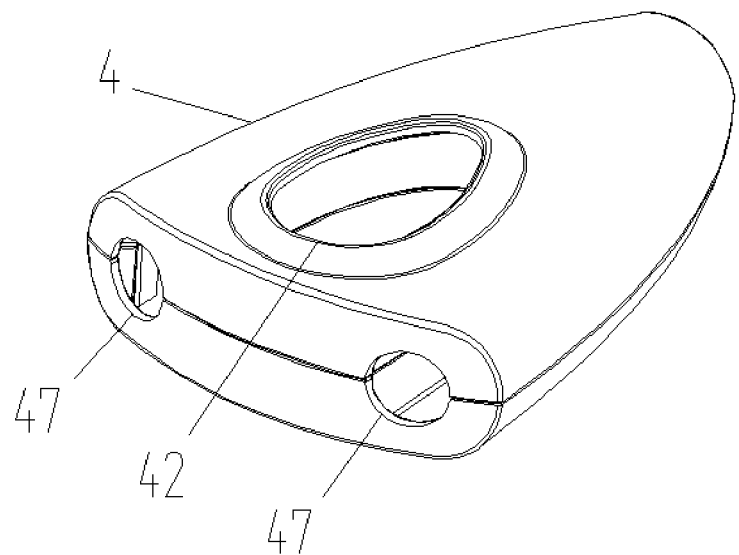
FIG. 6 is the view of two rope holes for the round rope main body.
Figure 7:
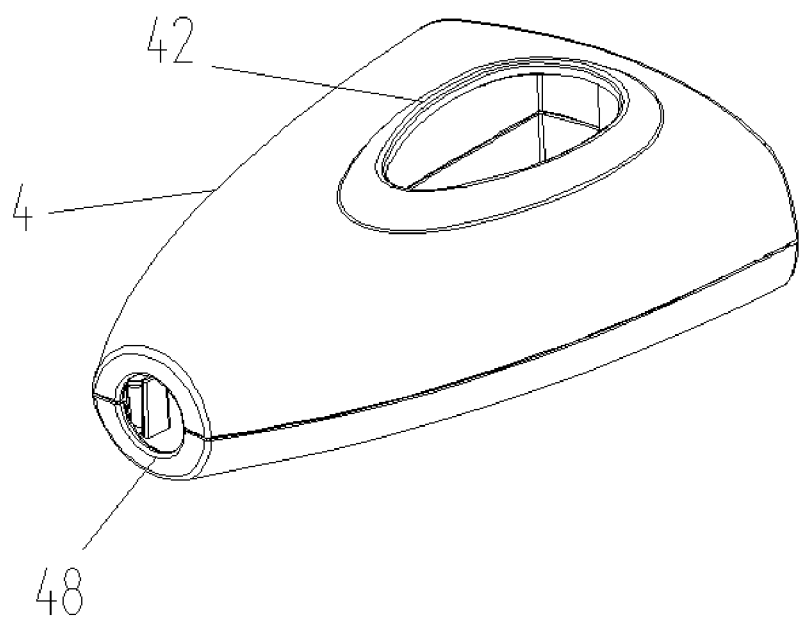
FIG. 7 is the view of a rope hole for the round rope main body.
Figure 8:
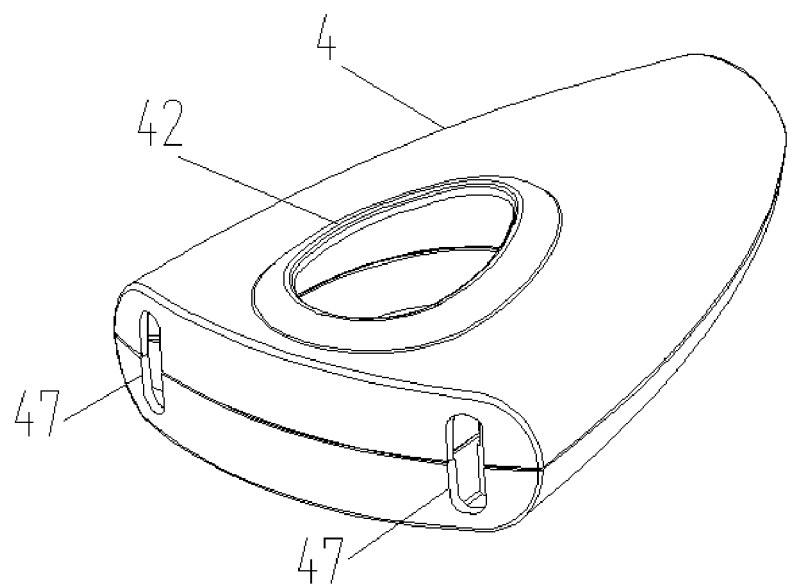
FIG. 8 is the view of two rope holes for the flat rope main body.
Figure 9:
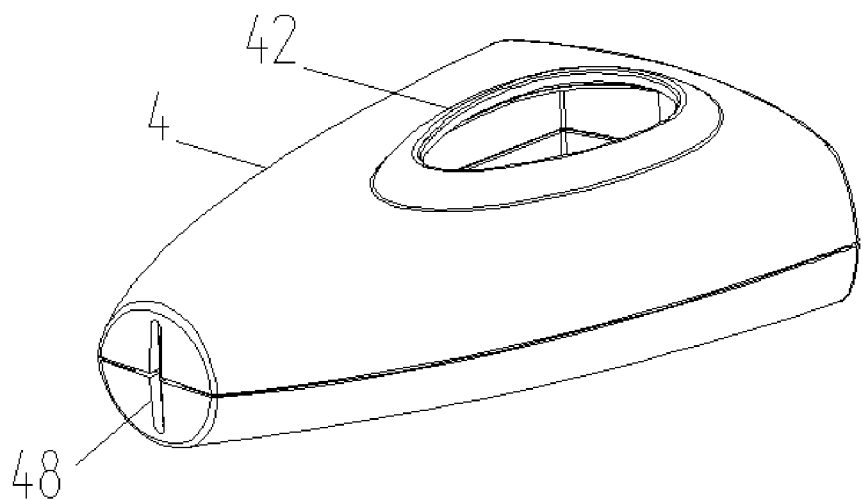
FIG. 9 is the view of a rope hole for the flat rope main body.

As shown in FIGS. 4 and 5, when walking a dog, a loose waste bag or a small roll of waste bags can be placed in the storage cavity 41. Waste bags can be directly extracted from the access port 42. The integration of the waste bag dispenser embedded in the dog rope leash effectively solves the problem of inconvenience from the existing technology of independent waste bag dispensers.

It should be noted that an independent waste bag dispenser can also be assembled in the storage cavity 41. In common uses, the storage cavity 41 can also be equipped with a flashlight or safety lights and other equipment to facilitate night use. The storage cavity 41 has a variety of uses, according to specific needs for flexible design. Further, the edge of the access port 42 arches to the outside of the connection box 4 to form a protruding part. The protruding part of the design can increase the volume of the storage cavity, but also decorates the appearance of the connection box.

As shown in FIGS. 2 to 5, one end of the rope body 1 bends in a loop and closes the opening to form the handle 2. The connection box 4 can be fixed on the handle 2 and can also be moved around the handle 2 to adjust the position. In an example provided in the utility model, the connection box 4 consists of the first cover body 43 and the second cover body 44, where the first cover body 43 and the second cover body 44 are connected together with removable fasteners 6. The access port 42 is located on the first cover body 43; the first cover body 43 has the first enclosing plate 45 protruding to the second cover body 44. The second cover body 44 has the second enclosing plate protruding to the first cover body 43. When the first cover body 43 and the second cover body 44 are assembled, the first enclosing plate 45 and the second enclosing plate 46 are flattened. The area surrounded by the first enclosing plate 45 and the second enclosing plate 46 together is the storage cavity 41.

As shown in FIGS. 6 to 9, the area outside the storage cavity 41 in connection box 4 is the rope cavity. The portion of the handle 2 and rope body 1 that forms the loop closure junction 49 is placed in the rope cavity of the connection box 4. The connection box 4 is provided with two rope holes 47 for the handle 2, and the other end of the connection box 4 is equipped with a rope hole 48 to assemble with the rope body 1. The rope hole 47 and the rope hole 48 match the cross-section shape of the rope body 1. When the rope body 1 is a round rope, the rope hole 47 and the rope hole 48 are round holes; when the rope body 1 is a flat rope, the rope holes 47 and the rope hole 48 are all flat holes. By covering the closed opening of the handle 2 with the connection box 4, the storage cavity feature is efficiently integrated with the leash. The connection box 4 can also be held while walking your dog, effectively used as a second handle.

Furthermore, the handle 2 exposed on the outside of the connection box 4 is covered with the flexible protective cover 8, which can be made of foam, neoprene, or other materials, optimizing the hand grip and comfort while holding the handle 2.

Furthermore, as shown in FIGS. 1 and 2, the clasp 3 is provided with a ring 31 for connecting with the rope body 1. The other end of the rope body 1 loops through the ring 31 and closes the opening, and the closure of the rope body 1 is covered by the decorative sleeve 7. Of course, the decorative sleeve 7 can also be replaced with a connecting box, both to cover the closed opening and to include the practical and elegant storage function.

The above-mentioned is only an example of the embodiments, and is not used to limit the embodiments. Any modifications, equivalent replacements and improvements made within the spirit and principles of the embodiments shall be included in the scope of protection.

The following list of claims replaces any prior listing of claims:

1. A dog rope leash with a storage function, comprising:
a rope body,
a handle on one end of the rope body,
a clasp on another end of the rope body, and further comprising:
a connection box mounted on the handle and/or rope body,
an inside of the connection box has a storage cavity, and
a surface of the connection box is connected with a storage cavity access port, wherein one end of the rope body is bent into a closed loop to form the handle,
the connection box is comprised of two connecting bodies wherein,
a first cover body is provided with a first enclosing plate protruding toward a second cover body,
the second cover body is provided with a second enclosing plate with the first enclosing plate flattened into the storage cavity, and
the access port is set on the first cover body,
an additional rope cavity outside the storage cavity in the connection box is for placing the rope,
the part of a rope main body near the handle is arranged in a rope cavity,
an end of the connection box is provided with two rope holes for assembly with the handle, and
an other end of the connection box is provided with a rope hole for the assembly with the rope main body.

2. The dog rope leash with a storage function according to claim 1, wherein the size of the access port is less than that of the storage cavity.

3. The dog rope leash with a storage function according to claim 1, further comprising a protruding part along an edge of the access port toward an outer of the connection box.

4. The dog rope leash with a storage function according to claim 1, wherein a part of the handle outside of the connection box is covered with a soft protective sleeve.

5. The dog rope leash with a storage function according to claim 1, wherein the first cover body and the second cover body and can be dismantled and connected together by fasteners.

6. A dog rope leash with a storage function, comprising:
a rope body,
a handle on one end of the rope body,
a clasp on another end of the rope body, and further comprising:
a connection box mounted on the handle and/or rope body,
an inside of the connection box has a storage cavity, and
a surface of the connection box is connected with a storage cavity access port, wherein
the clasp is provided with a ring for connecting with a main body of the rope,
the main body of the rope loops through the ring and is secured by sewing or a clamping mechanism,
the clasp is for connecting an animal collar or harness, and
a junction of the rope main body is covered by a decorative sleeve or the connection box.

* * * * *